(12) United States Patent
Chen et al.

(10) Patent No.: US 10,255,123 B2
(45) Date of Patent: Apr. 9, 2019

(54) MEMORY DEVICE AND METHOD FOR GUARANTEEING A MAPPING TABLE

(71) Applicant: Realtek Semiconductor Corporation, Hsinchu (TW)

(72) Inventors: Yen-Chung Chen, Hsinchu County (TW); Cheng-Yu Chen, New Taipei (TW); Chih-Ching Chien, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 196 days.

(21) Appl. No.: 15/299,477

(22) Filed: Oct. 21, 2016

(65) Prior Publication Data
US 2017/0212796 A1 Jul. 27, 2017

(30) Foreign Application Priority Data
Jan. 21, 2016 (TW) .............................. 105101895 A

(51) Int. Cl.
*G06F 11/00* (2006.01)
*G06F 11/07* (2006.01)
*G06F 12/1009* (2016.01)

(52) U.S. Cl.
CPC ........ *G06F 11/0727* (2013.01); *G06F 11/079* (2013.01); *G06F 11/0751* (2013.01); *G06F 12/1009* (2013.01); *G06F 2212/1032* (2013.01)

(58) Field of Classification Search
CPC ............... G06F 11/0727; G06F 11/073; G06F 11/0751; G06F 11/079; G06F 11/0793; G06F 12/0292; G06F 12/1009; G11C 29/52
See application file for complete search history.

(56) References Cited

U.S. PATENT DOCUMENTS

| | | | | |
|---|---|---|---|---|
| 8,489,854 B1 * | 7/2013 | Colon | ................. | G06F 12/0246 711/103 |
| 8,732,388 B2 * | 5/2014 | Chen | .................. | G06F 12/0246 711/103 |
| 9,817,725 B2 * | 11/2017 | Tsai | ..................... | G06F 11/1469 |
| 2010/0306451 A1 | 12/2010 | Johnson | | |
| 2011/0131365 A1 * | 6/2011 | Zhang | ................. | G06F 11/1441 711/103 |
| 2012/0066568 A1 * | 3/2012 | Komagome | ........ | G06F 11/1016 714/764 |
| 2018/0101481 A1 * | 4/2018 | Lin | ....................... | G06F 3/0619 |

* cited by examiner

*Primary Examiner* — Marc Duncan
(74) *Attorney, Agent, or Firm* — CKC & Partners Co., LLC

(57) ABSTRACT

A memory device includes a memory module and a control module. The control module is coupled to the memory module and is configured to store data into the memory module according to a first mapping table. The control module includes a storing unit and a guaranteeing unit. The storing unit is configured to store the first mapping table. The guaranteeing unit is coupled to the storing unit and is configured to determine whether the first mapping table is correct or not. The guaranteeing unit is further configured to issue an error signal in a state where the first mapping table is incorrect.

14 Claims, 5 Drawing Sheets

MEMORY DEVICE AND METHOD FOR GUARANTEEING A MAPPING TABLE

RELATED APPLICATIONS

This application claims priority to Taiwanese Application Serial Number 105101895, filed Jan. 21, 2016, which is herein incorporated by reference.

BACKGROUND

Technical Field

The present disclosure relates to a memory technology. More particularly, the present disclosure relates to a memory device and a method for guaranteeing a mapping table.

Description of Related Art

In a conventional technology, a memory device (for example, a solid state disk) stores data into a specific storing block according to an internal mapping table. If the memory device is powered off abnormally, it is very likely for the mapping table to become incorrect. Under this condition, an error about data storing operation of the memory device often occurs. In other words, the mapping table plays a very important role in the data storing operation of the memory device.

SUMMARY

One embodiment of the present disclosure is related to a memory device. The memory device includes a memory module and a control module. The control module is coupled to the memory module and is configured to store data into the memory module according to a first mapping table. The control module includes a storing unit and a guaranteeing unit. The storing unit is configured to store the first mapping table. The guaranteeing unit is coupled to the storing unit and is configured to determine whether the first mapping table is correct or not. The guaranteeing unit is further configured to issue an error signal in a state where the first mapping table is incorrect.

Another embodiment of the present disclosure is related to a memory device. The memory device includes a memory module, a storing unit, and a control module. The storing unit is configured to store a first mapping table. The control module is coupled to the memory module and is configured to store data into the memory module according to the first mapping table. The control module includes a guaranteeing unit. The guaranteeing unit is coupled to the storing unit and is configured to determine whether the first mapping table is correct or not. The guaranteeing unit is further configured to issue an error signal in a state where the first mapping table is incorrect.

Yet another embodiment of the present disclosure is related to a method for guaranteeing a mapping table. The method includes the steps of: determining whether a first mapping table stored in a storing unit of a memory device is correct or not by a guaranteeing unit of the memory device; and issuing an error signal by the guaranteeing unit in a state where the first mapping table is incorrect.

As shown in the above embodiments, the guaranteeing unit of the memory device of the present disclosure ensures the accuracy of the first mapping table, such that the memory device is able to operate normally and the stability of the memory device is increased.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
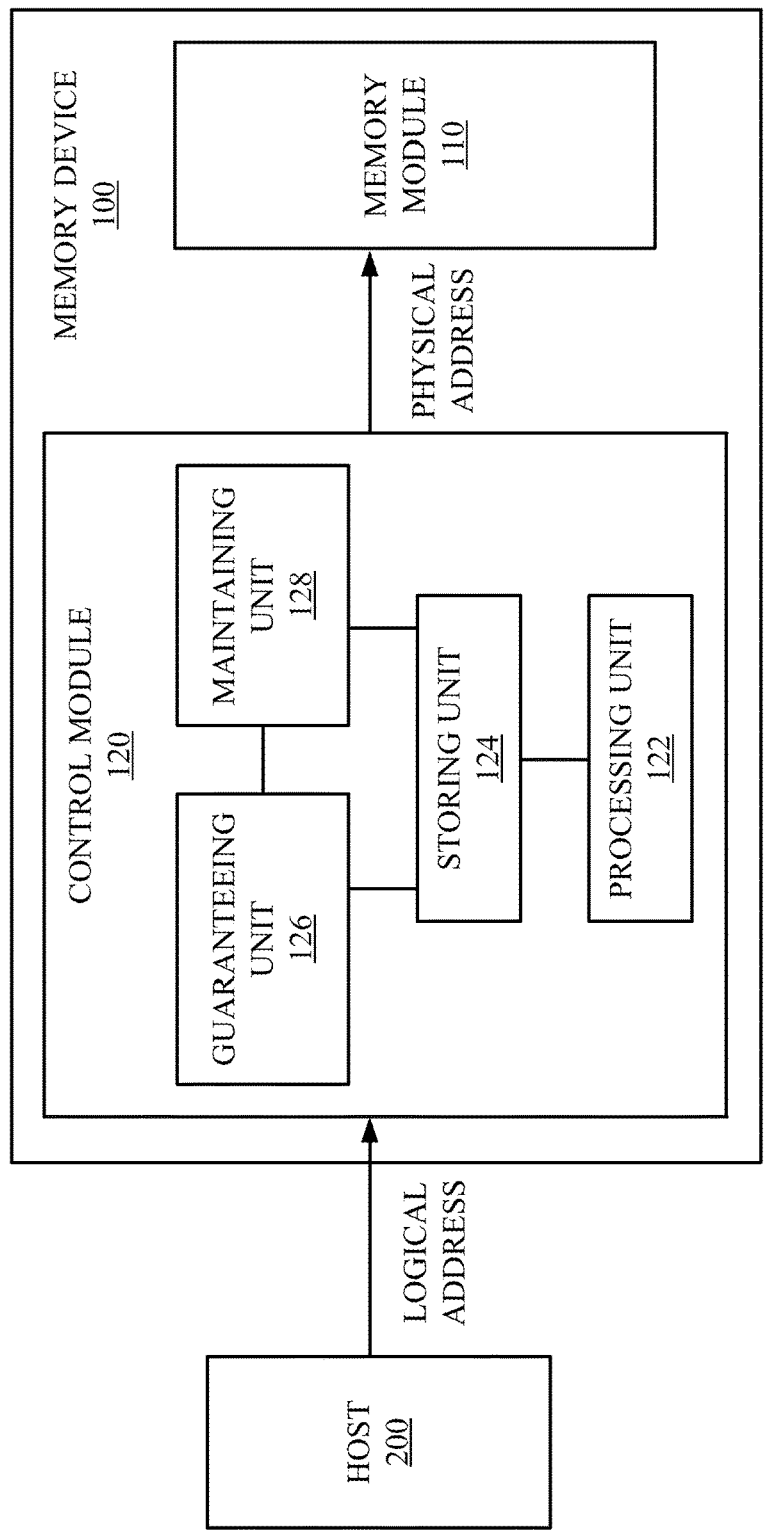
FIG. 1 is a schematic diagram illustrating a memory device and a host according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Moreover, the drawings are for the purpose of illustration only, and are not in accordance with the size of the original drawing. The same components in description are described with the same number to understand.

FIG. 1 is a schematic diagram illustrating a memory device 100 and a host 200 according to one embodiment of the present disclosure. As illustrated in FIG. 1, the memory device 100 is coupled to the host 200. In some embodiments, the memory device 100 may be a solid state disk (SSD) and the host 200 may be a computer, but are not limited thereto. The memory device 100 is configured to store the data sent from the host 200.

As illustrated in FIG. 1, the memory device 100 includes a memory module 110 and a control module 120. The memory module 110 is coupled to the control module 120. In some embodiments, the memory module 110 may be a non-volatile memory module, such as a NAND flash memory array. The control module 120 may be a controller or a control chip. In some embodiments, the control module 120 includes a processing unit 122, a storing unit 124, and a guaranteeing unit 126. In further embodiments, the control module 120 further includes a maintaining unit 128.

The storing unit 124 is configured to store a first mapping table. In the embodiments, the storing unit 124, for example, is a static random access memory (SRAM) or another type of storing unit. The first mapping table is a logical address to physical address (L2P) mapping table. The processing unit 122 is coupled to the storing unit 124. The processing unit 122 is configured to store data sent from the host 200 into a specific storing block of the memory module 110 according to the first mapping table in the storing unit 124. In greater detail, the processing unit 122 may receive a logical address from the host 200, and look up the first mapping table in the storing unit 124 to derive a physical address corresponding to the logical address. Then, according to the physical address, the processing unit 122 may store the data to be stored into the specific storing block of the memory module 110 corresponding to the physical address.

The guaranteeing unit 126 is coupled to the storing unit 124 and the maintaining unit 128. The guaranteeing unit 126 is configured to determine whether the first mapping table in the storing unit 124 is correct or not. The guaranteeing unit 126 may issue an error signal to the maintaining unit 128 when the guaranteeing unit 126 determines that the first mapping table is incorrect, thereby enabling the maintaining unit 128 to recover the first mapping table.

As mentioned above, the guaranteeing unit 126 and the maintaining unit 128 may be implemented in terms of hardware (HW) or firmware (FW). For example, if the execution speed and accuracy have priority, the above-mentioned units may be implemented in terms of hardware. If the design flexibility has higher priority, then the above-mentioned units may be implemented in terms of firmware.

In some embodiments, the processing unit 122 may immediately update the first mapping table stored in the storing unit 124. When the memory device 100 is powered off normally, the first mapping table storing in the storing unit 124 is transmitted to and is stored into the memory module 110. Thus, when the memory device 100 is powered up again, the first mapping table stored in the memory module 110 is transmitted back to the storing unit 124, such that the processing unit 122 is able to update the first mapping table immediately. On the other hand, the first mapping table recovered by the maintaining unit 128 also may be transmitted to and be stored into the memory module 110.

Figure 2A:
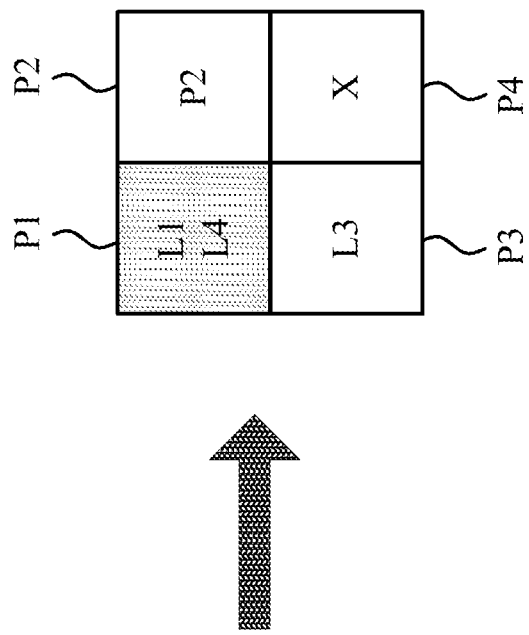
FIG. 2A is schematic diagram illustrating transforming a first mapping table into a second mapping table according to one embodiment of this disclosure.

The following paragraph describes how to determine whether the first mapping table is correct or not by the guaranteeing unit 126. FIG. 2A is schematic diagram illustrating transforming a first mapping table into a second mapping table according to one embodiment of this disclosure.

As illustrated in FIG. 2A, in some embodiments, the guaranteeing unit 126 may utilize an algorithm to transform the logical address to physical address (L2P) mapping table (the first mapping table) into the physical address to logical address (P2L) mapping table (the second mapping table). For ease of understanding, the first mapping table is referred to as a L2P mapping table hereinafter, and the second mapping table is referred to as a P2L mapping table hereinafter. The P2L mapping table transformed by the guaranteeing unit 126 is stored in the storing unit 124. Then, the guaranteeing unit 126 determines whether the L2P mapping table is correct or not according to the P2L mapping table.

The L2P mapping table (at the left side of FIG. 2A) includes logical addresses L1, L2, L3, and L4. The logical address L1 is corresponding to a physical address P1, the logical address L2 is corresponding to a physical address P2, the logical address L3 is corresponding to a physical address P3, and the logical address L4 is corresponding to a physical address P1. In other words, the relationships between the logical addresses and the physical addresses are not in a one-to-one manner. At the same time, if the processing unit 122 stores the data into the memory module 110 according to the L2P mapping table, different data may be stored into the same storing block. In other words, this L2P mapping table is incorrect.

In order to determine whether the L2P mapping table is correct or not, in some embodiments, the guaranteeing unit 126 transforms the L2P mapping table (at the left side of FIG. 2A) into the P2L mapping table (at the right side of FIG. 2A). In the P2L mapping table, the physical address P1 is corresponding to the logical address L1 and the logical address L4, the physical address P2 is corresponding to the logical address L2, and the physical address P3 is corresponding to the logical address L3.

The physical address P1 is corresponding to plural logical addresses (L1 and L4). Accordingly, the guaranteeing unit 126 determines that the L2P mapping table is incorrect, and issues the error signal to the maintaining unit 128. In some embodiments, the error signal may include the logical addresses (L1 and L4), such that the maintaining unit 128 is able to recover the L2P mapping table.

In some embodiments, an operation period of the guaranteeing unit 126 is a power-up period of the memory device 100. In some other embodiments, the operation period of the guaranteeing unit 126 is the entire operation period of the memory device 100.

Figure 2B:
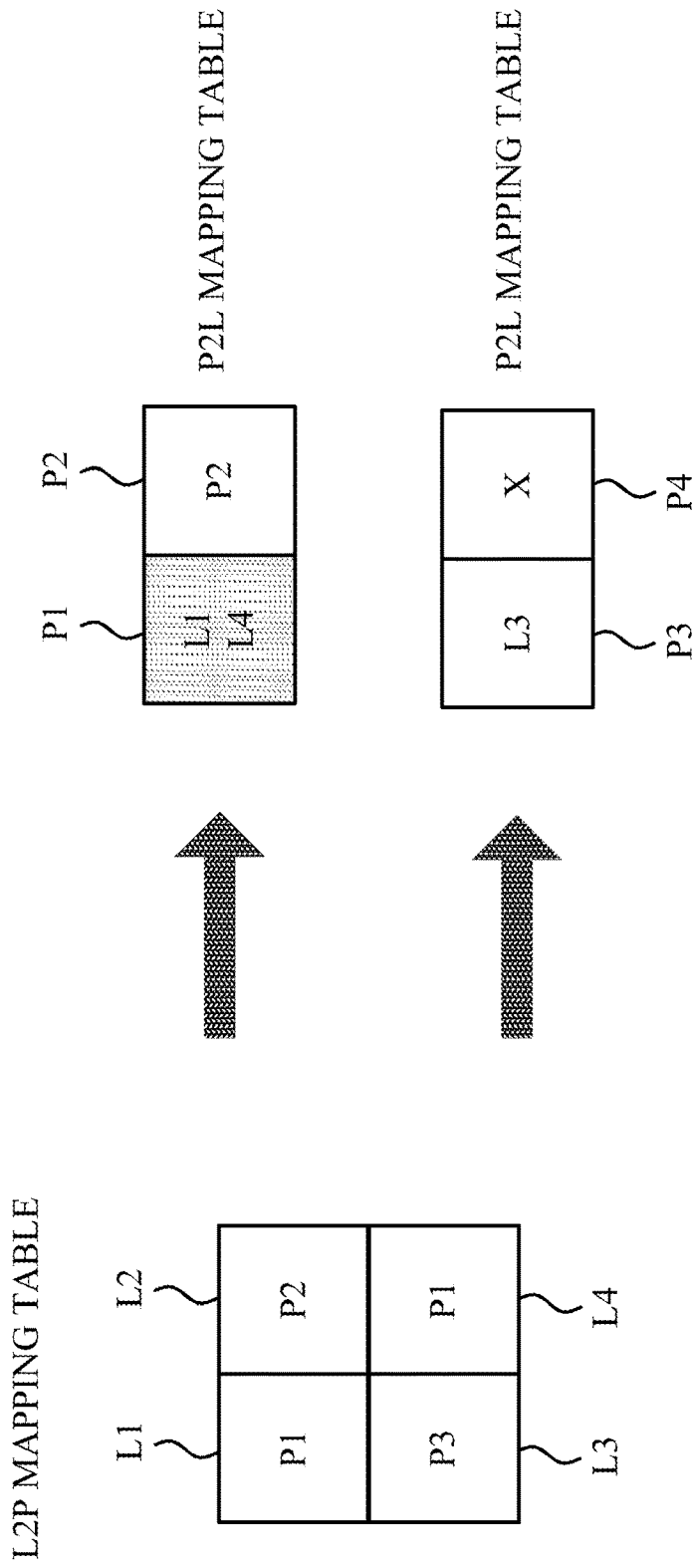
FIG. 2B is schematic diagram illustrating transforming a first mapping table into a plurality of second mapping tables according to one embodiment of this disclosure.

FIG. 2B is schematic diagram illustrating transforming a first mapping table into a plurality of second mapping tables according to one embodiment of this disclosure. The difference between FIG. 2B and FIG. 2A is that the L2P mapping table in FIG. 2B is transformed in batches. In other words, the guaranteeing unit 126 transforms different portions of the L2P mapping table into the P2L mapping tables respectively. As illustrated in FIG. 2B, the guaranteeing unit 126 transforms the portion of the L2P mapping table corresponding to the physical address P1 and the physical address P2 into a P2L mapping table shown at the upper side of FIG. 2B, and transforms the portion of the L2P mapping table corresponding to the physical address P3 and the physical address P4 into a P2L mapping table shown at the lower side of FIG. 2B. When all of the physical addresses in the L2P mapping table are transformed into the P2L mapping tables and all of the P2L mapping tables are checked, the L2P mapping table is completely checked. Since only a portion of L2P mapping table is transformed into a P2L mapping table at every time of transforming process, the storing space configured to store the transformed P2L mapping table may be reduced.

Figure 3:
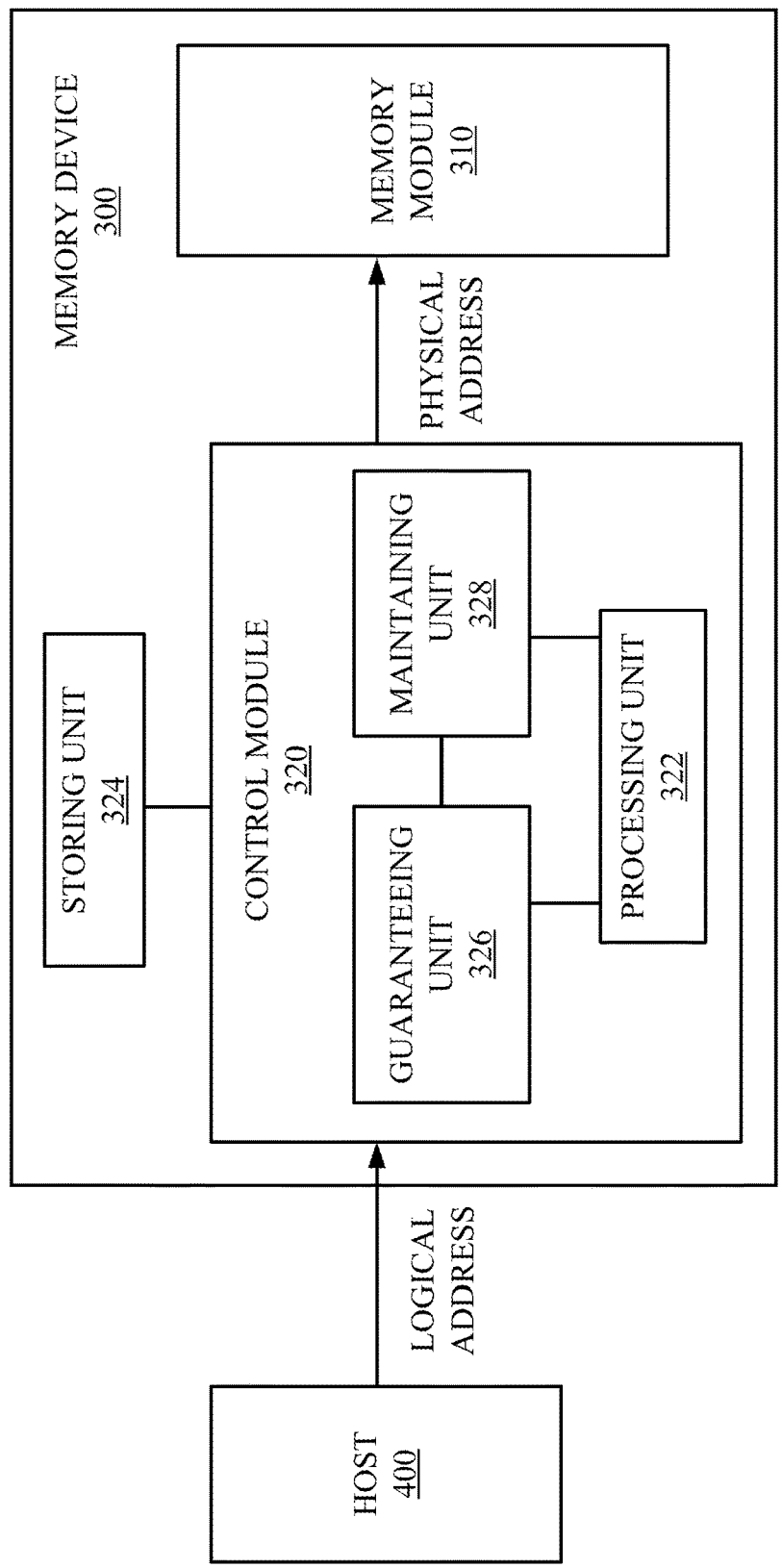
FIG. 3 is a schematic diagram illustrating a memory device and a host according to one embodiment of the present disclosure.

FIG. 3 is a schematic diagram illustrating a memory device 300 and a host 400 according to one embodiment of the present disclosure. The memory device 300 in FIG. 3 is similar to the memory device 100 in FIG. 1 except with reference numbers increased by two hundreds. In addition, the host 400 in FIG. 3 is similar to the host 200 in FIG. 1 except with reference numbers increased by two hundreds.

The difference between the memory device 300 and the memory device 100 is that the storing unit 324 is disposed outside the control module 320. In these embodiments, the storing unit 324, for example, is a dynamic random access memory (DRAM), a magneto-resistive random access memory (MRAM), a resistive random access memory (RRAM), or other storing units. The operations between the memory device 300 and the host 400 are described in above embodiments, and thus are not stated again herein.

Figure 4:
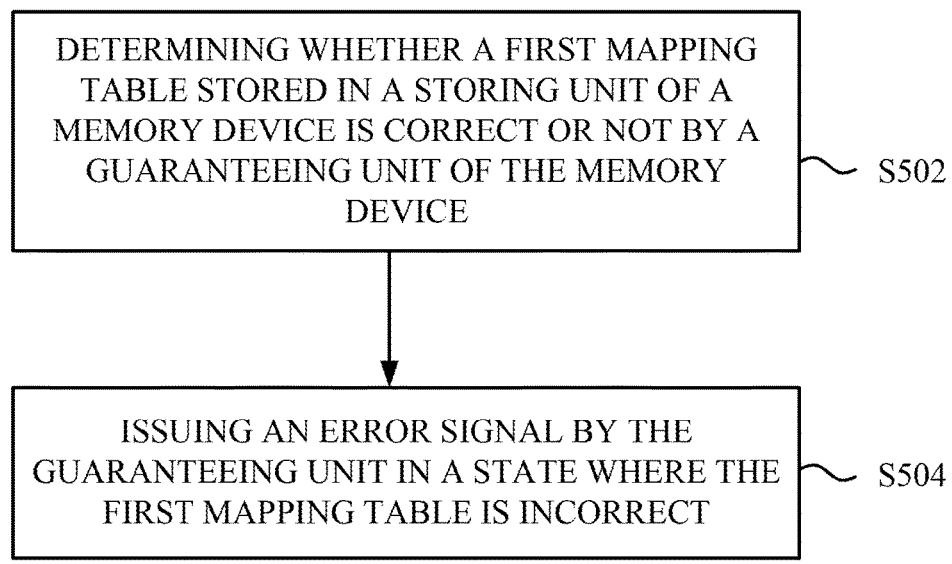
FIG. 4 is flow diagram illustrating a method for guaranteeing a mapping table according to one embodiment of this disclosure.

FIG. 4 is flow diagram illustrating a method 500 for guaranteeing a mapping table according to one embodiment of this disclosure. As illustrated in FIG. 4, the method 500 at least includes step S502 and step S504. In some embodiments, the method 500 may be implemented in the memory device 100 and the host 200 in FIG. 1. In other embodiments, the method 500 may be implemented in the memory device 300 and the host 400 in FIG. 3.

In the example shown in FIG. 1, step S502 is performed for determining whether the first mapping table stored in the storing unit 124 of the memory device 100 is correct or not by the guaranteeing unit 126 of the memory device 100. Step S504 is performed for issuing the error signal in a state where the first mapping table is incorrect by the guaranteeing unit 126.

In the example shown in FIG. 3, step S502 is performed for determining whether the first mapping table stored in the storing unit 324 of the memory device 300 is correct or not by the guaranteeing unit 326 of the memory device 300. Step S504 is performed for issuing the error signal by the guaranteeing unit 326 in a state where the first mapping table is incorrect.

The above illustrations include exemplary operations in sequence, but the exemplary operations are not necessarily performed in the order shown here. Various orders of operations are within the contemplated scope of the present disclosure. Moreover, operations may be added, replaced, changed to different orders, and/or eliminated as appropriate, in accordance with the spirit and scope of various embodiments of the present disclosure.

As the above embodiments, the guaranteeing unit of the memory device of the present disclosure ensures the accuracy of the first mapping table, such that the memory device is able to operate normally and the stability of the memory device is increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A memory device, comprising:
   a memory module; and
   a control module coupled to the memory module and configured to store data into the memory module according to a first mapping table, wherein the control module comprises:
   a storing unit configured to store the first mapping table; and
   a guaranteeing circuit coupled to the storing unit and configured to determine whether the first mapping table is correct or not, wherein the guaranteeing circuit is further configured to issue an error signal in a state where the first mapping table is incorrect,
   wherein the guaranteeing circuit is further configured to transform a portion of the first mapping table into a second mapping table, and is configured to determine whether the first mapping table is correct or not according to the second mapping table,
   wherein the guaranteeing circuit is further configured to determine that the first mapping table is incorrect in a state where the second mapping table indicates that a physical address corresponds to a plurality of logical addresses.

2. The memory device of claim 1, wherein the first mapping table is a logical address to physical address mapping table, and the second mapping table is a physical address to logical address mapping table.

3. The memory device of claim 1, wherein the storing unit is further configured to store the second mapping table.

4. The memory device of claim 1, wherein the control module further comprises:
   a maintaining circuit coupled to the guaranteeing circuit and the storing unit, wherein the maintaining circuit is configured to receive the error signal and configured to recover the first mapping table according to the error signal.

5. The memory device of claim 4, wherein the memory module is configured to store the recovered first mapping table.

6. A memory device, comprising:
   a memory module;
   a storing unit configured to store a first mapping table; and
   a control module coupled to the memory module and configured to store data into the memory module according to the first mapping table, wherein the control module comprises:
   a guaranteeing circuit coupled to the storing unit and configured to determine whether the first mapping table is correct or not, wherein the guaranteeing circuit is further configured to issue an error signal in a state where the first mapping table is incorrect,
   wherein the guaranteeing circuit is further configured to transform a portion of the first mapping table into a second mapping table, and is configured to determine whether the first mapping table is correct or not according to the second mapping table,
   wherein the guaranteeing circuit is further configured to determine that the first mapping table is incorrect in a state where the second mapping table indicates that a physical address corresponds to a plurality of logical addresses.

7. The memory device of claim 6, wherein the first mapping table is a logical address to physical address mapping table, and the second mapping table is a physical address to logical address mapping table.

8. The memory device of claim 6, wherein the storing unit is further configured to store the second mapping table.

9. The memory device of claim 6, wherein the control module further comprises:
   a maintaining circuit coupled to the guaranteeing circuit and the storing unit, wherein the maintaining circuit is configured to receive the error signal and configured to recover the first mapping table according to the error signal.

10. The memory device of claim 9, wherein the memory module is configured to store the recovered first mapping table.

11. A method for guaranteeing a mapping table, wherein the method comprises:
    determining whether a first mapping table stored in a storing unit of a memory device is correct or not by a guaranteeing circuit of the memory device; and
    issuing an error signal by the guaranteeing circuit in a state where the first mapping table is incorrect,
    determining whether the first mapping table is correct or not comprises:
    transforming a portion of the first mapping table into a second mapping table by the guaranteeing circuit; and determining whether the first mapping table is correct or not according to the second mapping table by the guaranteeing circuit,
wherein determining whether the first mapping table is correct or not according to the second mapping table comprises:
determining that the first mapping table is incorrect in a state where the second mapping table indicates that a physical address corresponds to a plurality of logical addresses by the guaranteeing circuit.

12. The method of claim 11, wherein the first mapping table is a logical address to physical address mapping table, and the second mapping table is a physical address to logical address mapping table.

13. The method of claim 11, further comprising:
storing the second mapping table by the storing unit of the memory device.

14. The method of claim 11, further comprising:
recovering the first mapping table according to the error signal by a maintaining circuit of the memory device.

* * * * *